United States Patent [19]
Carlson et al.

[11] 3,878,208

[45] Apr. 15, 1975

[54] TREATMENT OF AQUEOUS WASTE STREAMS WITH HYDROGEN PEROXIDE TO REMOVE CHLORINATED ISOCYANURATES THEREFROM

[75] Inventors: Ronald H. Carlson, Willingboro; Raymond N. Mesiah, Somerset, both of N.J.; Harold R. Chancey, Charleston, W. Va.

[73] Assignee: FMC Corporation, New York, N.Y.

[22] Filed: Dec. 14, 1973

[21] Appl. No.: 425,167

[52] U.S. Cl. .......................... 260/248 A; 260/248 C
[51] Int. Cl. ............................................ C07d 55/36
[58] Field of Search ..................... 260/248 C, 248 A

[56] References Cited
UNITED STATES PATENTS
3,524,853  8/1970  Saito et al. ........................... 260/248

Primary Examiner—John M. Ford

[57] ABSTRACT

Aqueous waste streams containing dissolved chlorinated isocyanurates and sodium chloride are contacted with hydrogen peroxide at a pH of about 0.5 to 12.0 whereby the chlorinated isocyanurates are converted to substantially insoluble cyanurate values which are separated by filtration or otherwise removed. The cyanurate values consist mainly of cyanuric acid at the lower pH range and sodium cyanurates at the upper pH range. The resulting filtrate is much lower in organics than the original waste streams.

The treatment constitutes an effective pollution control measure which can operate in conjunction with existing processes of manufacturing chlorinated isocyanurate chemicals.

4 Claims, No Drawings

TREATMENT OF AQUEOUS WASTE STREAMS WITH HYDROGEN PEROXIDE TO REMOVE CHLORINATED ISOCYANURATES THEREFROM

This invention relates to the removal of chlorinated isocyanurates from aqueous media, particularly aqueous waste streams from the manufacture of chlorinated isocyanuric acids and their salts.

Chlorinated isocyanuric acids and their alkali metal salts are familiar chemical entities which are useful as a source of active chlorine. Especially important members are sodium dichloroisocyanurate and trichloroisocyanuric acid. These are high-purity, white crystalline solids, available in a variety of mesh sizes. Although active oxidizers, they can be handled and transported with relative ease and safety. One of the important commercial applications of these products is in the area of water treatment where they have proved effective and convenient for controlling algae and pathogenic bacteria. The water in swimming pools, for example, is readily maintained in a clean and sanitary condition by the addition of chlorinated cyanuric acid derivatives. Other volume uses are as a dry bleach in cleansing, laundering and sanitizing compositions and the like.

Alkali metal dichloroisocyanurates and trichloroisocyanuric acid are produced commercially by the chlorination in aqueous media of alkali metal cyanurates. The process is well known and documented extensively in the technical and patent literature and in this connection reference is made to U.S. Pat. Nos. 3,299,060, 2,969,360, and 3,035,056. The principal reactions involved, omitting intermediate stages and species, can be depicted by the following simplified chemical equation in which the alkali metal is sodium:

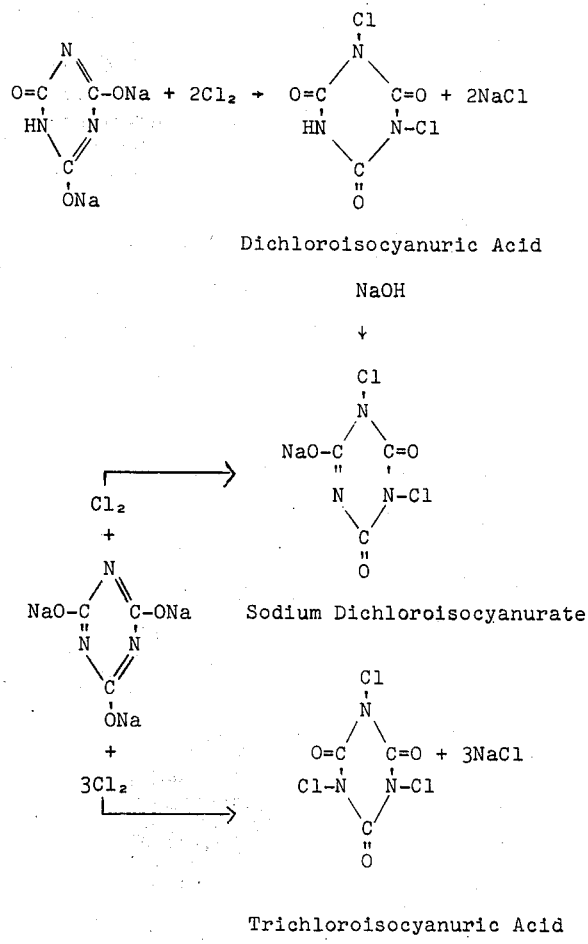

Dichloroisocyanuric Acid

Sodium Dichloroisocyanurate

Trichloroisocyanuric Acid

The chlorination can be carried out by passing chlorine through an aqueous slurry of the di- or trisodium cyanurate thereby forming the corresponding di- or trichloroisocyanuric acid. These are filtered from the reaction mixture and the resulting filtrate, which contains up to about 2.0 percent dissolved chlorinated isocyanuric acids, constitutes an acid waste stream having a pH range of about 0.5 to 5.0. The dichloroisocyanuric acid is neutralized with base, e.g., aqueous sodium hydroxide and the so-formed sodium dichloroisocyanurate filtered off. The filtrate from the neutralization contains up to about 25 percent dissolved chlorinated sodium isocyanurate and constitutes a near neutral waste stream having a pH range of about 6.5 to 7.0. Alternatively, the sodium dichloroisocyanurate can be realized directly by selective chlorination of trisodium cyanurate wherein two of the sodiums are replaced with chlorine while the third sodium remains attached to the cyanurate ring. The waste stream from this operation exhibits a pH in the vicinity of 5.0 to 7.5. In general the pH of chlorinated isocyanurate waste streams will run from about 0.5 to 7.5. Where a neutral and an acid waste stream are produced these may be combined to yield a single waste stream.

Of all the chlorinated isocyanurate derivatives, sodium dichloroisocyanurate enjoys the greatest commercial usage since it possesses such desirable attributes as stability, water solubility and high available chlorine content. Although essentially water-insoluble, trichloroisocyanuric acid has the highest available chlorine and because of this may be preferred for certain applications. Generally speaking, however, both derivatives are important industrial chemicals.

While entirely satisfactory from a purely technical aspect, the manufacture of sodium dichloroisocyanurate and trichloroisocyanuric acid is accompanied by the production of aqueous waste streams containing dissolved cyanurates, the pollution-free disposal of which presents a special problem. A practical solution to this difficulty is a requirement for a commercially successful operation.

One approach to the problem is to treat the aqueous waste streams with active carbon powders as disclosed in U.S. Pat. application Ser. No. 351,278, filed Apr. 16, 1973 in the name of Ronald H. Carlson and assigned to the asignee of the instant application. The active carbon was found to exhibit a singularly strong affinity for dissolved cyanurates so that they were removed from the cyanurate waste streams after relatively brief contact times with the active carbon. Although the process of the application effectively cleans up the waste streams, the need to purchase and handle large quantities of active carbon powder increases operating costs. The disadvantage is partially offset by recycling cyanurate values recovered from the exhausted carbon. Even so, the process is not as economically attractive as might be desired and further improvements in the treatment of chlorinated isocyanurate waste streams are being actively pursued.

It has now been discovered that in the manufacture of chlorinated isocyanurates wherein there is produced an aqueous waste stream having a pH of from about 0.5 to about 7.0 and containing dissolved therein chlorinated isocyanurate values preferably from the class consisting of chlorinated isocyanuric acids and sodium dichloroisocyanurate, such chlorinated isocyanurate values can be removed from said waste streams by treating the streams with hydrogen peroxide at a pH of from about 0.5 to about 12 whereby the chlorinated isocyanurate values are dechlorinated to cyanurate values. These consist predominately of sodium cyanurate salts at the upper part of the pH range and cyanuric acid at the lower part of the pH range.

In carrying out the invention, sufficient hydrogen peroxide is added to the waste stream liquor to chemically reduce the chlorinated isocyanurates to cyanurate values, namely cyanuric acid or its sodium salts, which precipitate from the reaction mixture and are isolated using known procedures such as filtration, settling, centrifugation or the like. The recovered cyanurate values can be recycled back to the chlorination zone. Thorough agitation is maintained during addition of the peroxide.

The reaction of chlorinated isocyanurates with hydrogen peroxide is an oxidation-reduction system wherein oxygen is oxidized from a minus one to a zero valence while chlorine is reduced from a plus one to a minus one valence. Therefore, the reaction can be monitored instrumentally by utilizing the voltage differential which marks the end point. Using a standard platinum indicating electrode and a standard calomel reference electrode, a voltage decrease of 550 millivolts (e.g. −600 to −50 mv) on $H_2O_2$ addition generally indicates total exhaustion of available chlorine.

The hydrogen peroxide is conveniently used as an aqueous solution wherein the concentration by weight of the hydrogen peroxide is desirably from about 10 percent to about 75 percent, preferably 15 to 35 percent and more preferably about 15 to 25 percent; an excess of up to about 10 percent over the required stoichiometry is recommended for optimum results.

The process of the invention can be carried out at any temperature at which the aqueous waste liquor is in the liquid state at about normal pressures. Operating temperatures normally range from about 0°C to about 50°C, preferably from about 5°C to 30°C. Reaction times normally vary between 0.25 and 2.0 hours depending upon reaction temperatures.

In addition to dissolved chlorinated isocyanurates, other soluble species present in the aqueous waste stream include about 6 to about 11 percent sodium chloride plus minor amounts of other compounds such as sodium sulfate, sodium hypochlorite, hydrochloric acid, sulfuric acid, hypochlorous acid and non-chlorinated isocyanuric acid values. In general, the total quantity of non-chlorinated species including sodium chloride constitutes about 7 to 12 percent of the waste stream.

The dechlorinated cyanurate values are recovered as a precipitate of cyanuric acid or the sodium salt thereof, depending on pH conditions. Where the pH of the waste stream is on the acid side, the recovered cyanurate values consist mainly of cyanuric acid. Where the pH is on the neutral to alkaline side, the recovered cyanurate values consist mainly of the sodium salts of cyanuric acid. The monosodium salt is the principal product at pH near 6.0 while the disodium salt predominates at pH near 12.0; mixtures of the two salts are formed at intermediate pH levels.

The amount of cyanurate values removed will depend on the solubility of these entities in the aqueous waste stream following the hydrogen peroxide treatment. Generally speaking, the solubility of cyanuric acid in the treated waste stream is 0.3 percent and approximately 65–85 percent can be recovered as solid product. The solubility of the sodium cyanurate salts is about 0.02 to 0.05 percent (depending upon pH, temperature and salt concentration), and approximately 95–98 percent of these can be recovered in solid form.

After the solid cyanurate values have been removed, the resulting filtrate contains a low level of organic matter - of the order of 200 to 500 ppm - and accordingly is more suitable for discharge into natural water systems with minimal impact on biological oxygen demand. The dechlorination of the chlorinated isocyanurates is believed to take place in accordance with the following stoichiometry:

A. $Cl_yH_{3-y}CA + yH_2O_2$ 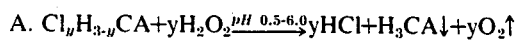 $yHCl + H_3CA\downarrow + yO_2\uparrow$

B. $Cl_yH_{3-y}CA + yH_2O_2 + (y+n)NaOH$ 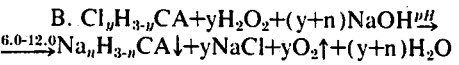 $Na_nH_{3-n}CA\downarrow + yNaCl + yO_2\uparrow + (y+n)H_2O$ wherein $y$ is an integer of 1 to 3; $n$ is an integer of 1 to 2; and CA represents the trivalent cyanurate radical. A side reaction occurs in accordance with the following equation:

$$HOCl + HCl \rightleftarrows H_2O + Cl_2\uparrow$$

In an industrial installation, the evolved chlorine can be recycled back to the chlorination zone for reaction with the sodium cyanurate slurry.

The invention is illustrated in greater detail by the following non-limiting examples in which all percentages are by weight unless specified otherwise. In Examples 1, 2, 4 and 5 the chlorinated isocyanurate waste streams are synthetic mixtures whereas in Example 3, a plant specimen is used.

EXAMPLE 1

Dichloroisocyanuric acid (9 g., 0.045 mole), trichloroisocyanuric acid (1.1 g., 0.0047 mole) and sodium chloride (100 g.) were mixed with 1-liter of water in a 2-liter beaker fitted with a magnetic stirrer and ice bath. The mixture was cooled to 12°C and 16.6 percent aqueous hydrogen peroxide solution slowly added over a 10-minute period. During this time, there was a heavy evolution of chlorine which became negligible after a total of 25.0 g. (0.12 mole) of the hydrogen peroxide solution had been added. Approximately 30 seconds before the hydrogen peroxide addition was stopped, a large quantity of solids had precipitated. Theses were filtered and washed with two 25-ml portions of water which were added to the filtrate. After drying, the product weighed 4.49 g. and analyzed 98.6 percent cyanuric acid which represents a 69 percent recovery of cyanuric acid value.

EXAMPLE 2

Dichloroisocyanuric acid (70 g., 0.35 mole) and 670 g. of sodium chloride were mixed with 6,000 ml of water in an 8-l. beaker fitted with a mechanical stirrer, ice bath, and a dropping funnel containing a 16.5 percent aqueous hydrogen peroxide solution. The mixture was cooled to 5°C and the hydrogen peroxide added slowly during which time there was evolution of gas which gave a positive test for active chlorine. Solids began to precipitate after introduction of approximately 85 ml of the hydrogen peroxide solution. Peroxide addition was stopped when the vapors above the reaction mixture gave a negative test with potassium iodide test paper. A total of 148 g. of the 16.5 percent hydrogen peroxide solution (0.72 mole) was added. The slurry was filtered and the solids washed with five 75 ml portions of water which were combined with the filtrate. The solids were dried to give 33.2 g. of a white product which analyzed as 98.9 percent cyanuric acid, representing a 73% recovery of cyanuric acid value.

EXAMPLE 3

In this example, the chlorinated isocyanurate was obtained from the dichloroisocyanuric acid overflow waste stream of a chlorinated isocyanuric acid plant.

While mechanically agitating a 2970 g. portion of this dichloroiscyanuric acid waste stream maintained at 10°C, 22.58 percent aqueous hydrogen peroxide was added from a burette. During peroxide addition, the voltage of the system was monitored using Platinum and Calomel electrodes. A very sharp break in the voltage curve occurred after about 50 ml of peroxide had been added indicating approaching depletion of the dichloroisocyanuric acid. After introducing a total of 75 ml of the peroxide solution, the voltage of the system measured −90 mv, compared to an initial reading of −600 mv for the untreated chlorinator waste.

After peroxide addition, the resulting insoluble cyanuric acid was separated by filtration, washed free of sodium chloride, dried at 130°C and weighed. A total of 38.0 g. of cyanuric acid was obtained, corresponding to greater than 80 percent recovery.

EXAMPLE 4

A synthetic waste solution simulating plant trichloroisocyanuric acid waste effluent was prepared, having the following composition by weight:

| | |
|---|---|
| sodium chloride | 10.0% |
| cyanuric acid | 1.6% |
| trichlorisocyanuric acid | 1.1% |
| sodium hypochlorite | 3.8% |
| water | 83.5% |

This solution contained a total nitrogen concentration of 0.718 percent by weight (7.9 g/l).

Using the procedure of Example 3, a 2,000 g. portion of this synthetic waste solution was cooled to 10°C and treated with 35 percent aqueous hydrogen peroxide using redox controls. After 25 ml of the hydrogen peroxide solution had been introduced, a sharp break occurred in the voltage curve indicating approaching depletion of the trichloroisocyanuric acid. After introducing a total of 44 ml of the hydrogen peroxide solution, the voltage measured −150 mv compared to an initial reading of −600 mv for the untreated solution. The so-treated material was allowed to stand for 2 hours at 10°C and then filtered free of insoluble cyanuric acid. Analysis of the filtrate indicated >80 percent removal of cyanuric acid values by the hydrogen peroxide treatment.

EXAMPLE 5

This example relates to treatment of wastes containing sodium dichloroisocyanurate in a neutral hydrogen peroxide medium.

To a 1 liter solution (pH 6.2) containing 20 g. (0.091 moles) of sodium dichloroisocyanurate and 100 g. of sodium chloride was simultaneously added dropwise about 25 g. of 30 percent aqueous hydrogen peroxide and 14.6 g. (0.182 moles) of 50 percent sodium hydroxide; pH was maintained in the range of 6–9 while the temperature was held at ~8°C with an ice bath. After hydrogen peroxide addition, a white slurry (pH ~9) was present which was allowed to equilibrate for 35 minutes with stirring. After equilibration, the cold slurry (~8°C) was filtered on a medium sintered glass funnel to yield a clear filtrate. The unwashed solids were dried at 130°C (2 hours, atmospheric pressure) to yield 17.0 g. of product analyzing 70.03 percent cyanuric acid, 18.8 percent sodium ion, 0.34 percent available chlorine and 8.04 percent water, indicating a composition of about 91 percent sodium cyanurate monohydrate and 9 percent sodium chloride. Analysis of the filtrate showed a residual cyanuric acid level of only 0.02 percent and an available chlorine level of 0.0002 percent. Cyanurate value recovery from the sodium dichloroisocyanurate solution was therefore essentially 100 percent due to the very low solubility of sodium cyanurate in neutral salt solution.

What is claimed is:

1. In the manufacture of chlorinated isocyanurates wherein there is produced an aqueous waste stream having a pH of from about 0.5 to about 7.0 and containing dissolved therein chlorinated isocyanurate values, a method of removing such chlorinated isocyanurate values from the waste streams by treating said streams with hydrogen peroxide at a pH of from about 0.5 to about 12 whereby the chlorinated isocyanurate values are dechlorinated to produce a precipitate of cyanurate values and recovering the precipitated cyanurate values from the so-treated stream.

2. The method according to claim 1 wherein the waste stream contains a mixture of (1) a substantially acid aqueous waste stream having a pH of from about 0.5 to 5.0 and containing dissolved therein chlorinated isocyanuric acids in a combined amount of up to about 2.0 percent and (2) a substantially neutral aqueous waste stream having a pH of from about 6.5 to 7.0 and containing dissolved therein sodium dichloroisocyanurate in an amount of up to about 25 percent.

3. A method according to claim 1 wherein the chlorinated isocyanurate values are selected from the class consisting of chlorinated cyanuric acids and sodium dichloroisocyanurate.

4. A method according to claim 3 wherein the cyanurate values consist predominately of sodium cyanurate salts when the treatment is carried out at the upper part of the pH range and cyanuric acid when the treatment is carried out at the lower part of the pH range.

* * * * *